(12) United States Patent
Yepez

(10) Patent No.: US 10,600,115 B2
(45) Date of Patent: Mar. 24, 2020

(54) VIRTUAL STORE AND SOCIAL MEDIA INTEGRATION

(71) Applicant: NCR Corporation, Duluth, GA (US)

(72) Inventor: Rafael Yepez, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 286 days.

(21) Appl. No.: 15/663,050

(22) Filed: Jul. 28, 2017

(65) Prior Publication Data

US 2019/0035007 A1   Jan. 31, 2019

(51) Int. Cl.
| | |
|---|---|
| *G06Q 30/02* | (2012.01) |
| *G06Q 30/06* | (2012.01) |
| *G06Q 50/00* | (2012.01) |
| *G06F 16/583* | (2019.01) |
| *G06F 3/0484* | (2013.01) |
| *G06T 7/246* | (2017.01) |

(52) U.S. Cl.
CPC ....... *G06Q 30/0643* (2013.01); *G06F 16/583* (2019.01); *G06Q 30/0201* (2013.01); *G06Q 30/0625* (2013.01); *G06Q 50/01* (2013.01); *G06F 3/04842* (2013.01); *G06Q 30/0613* (2013.01); *G06T 7/246* (2017.01); *G06T 2207/10016* (2013.01); *G06T 2207/20221* (2013.01); *G06T 2207/30196* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 8,023,800 B2 * | 9/2011 | Concotelli | G11B 27/034 386/291 |
| 2019/0050427 A1 * | 2/2019 | Wiesel | G06N 20/00 |

* cited by examiner

*Primary Examiner* — Marilyn G Macasiano
(74) *Attorney, Agent, or Firm* — Schwegman, Lundberg & Woessner

(57) ABSTRACT

A first image/video of a user and a second image of a product are identified. The second image is merged into a merged image/video depicting the product being worn by the user. A purchase button is provided with the merged image/video that when activated completes a purchase of the product for the user. In an embodiment, the merged image/video is shared on a social media platform and views, likes, re-posts, dislikes, and/or purchases are tracked for the product.

12 Claims, 6 Drawing Sheets

VIRTUAL STORE AND SOCIAL MEDIA INTEGRATION

BACKGROUND

More and more individuals are conducting personal, professional, and social affairs online and through social media. Nearly every business has an online presence over the Internet and nearly every individual above the age of 14 has at least some presence on one or more social media platforms.

The rate at which individuals are performing online transactions with the businesses continues to be nearly exponential. Middle-aged adults and older adults are the reason that most brick-and-mortar storefronts are staying afloat in the industry. Younger adults and teenagers have become fully immersed in mobile transaction processing and social media activity.

However, even the younger adults and the teenagers often prefer to physically visit some stores for purposes of trying on apparel. Social acceptance and social likes have become a part of the younger generations existence, such that even if an individual is happy with the way a piece of apparel fits and looks on them, that individual will quickly return the apparel if friends on social media disagree.

Conversely, if the apparel is liked by the friends, the word spreads quickly on social media providing a no cost and lucrative advertisement for the apparel's manufacturers, distributors, and retailers. Yet, at present manufacturers, distributors, and retailers have no way of knowing, monitoring, planning, and controlling social media successes beyond paying a celebrity a healthy amount of money to wear and promote a product on social media. However, sometimes the best successes come from non-celebrities on social media.

At the same time that his phenomenon is occurring with the younger generation, social media platforms have yet to figure out how to generate revenue and become profitable even when such platforms have hundreds of millions if not a billion plus users. Furthermore, the social media presence by businesses is weak at best and often viewed as more of a nuisance by the younger generation.

As a result, both the social media platforms and businesses are struggling to reach and expand revenues with this younger generation. Concurrently, the younger generation is not purchasing apparel at rates that it could be expected to because of social stigma with their social media friends and because purchasing often requires physically visiting a brick-and-mortar storefront, which can be inconvenient and which is less conducive to impulse purchasing that online purchasing.

SUMMARY

In various embodiments, methods and a system for virtual store and social media integration processing are presented.

According to an embodiment, a method for virtual store and social media integration processing is presented. More particularly, a product image for a product is merged with a media file creating a merged media file. The merged media file is presented with a transaction button that when activated provides transaction processing for purchasing the product.

DETAILED DESCRIPTION

Figure 1A:
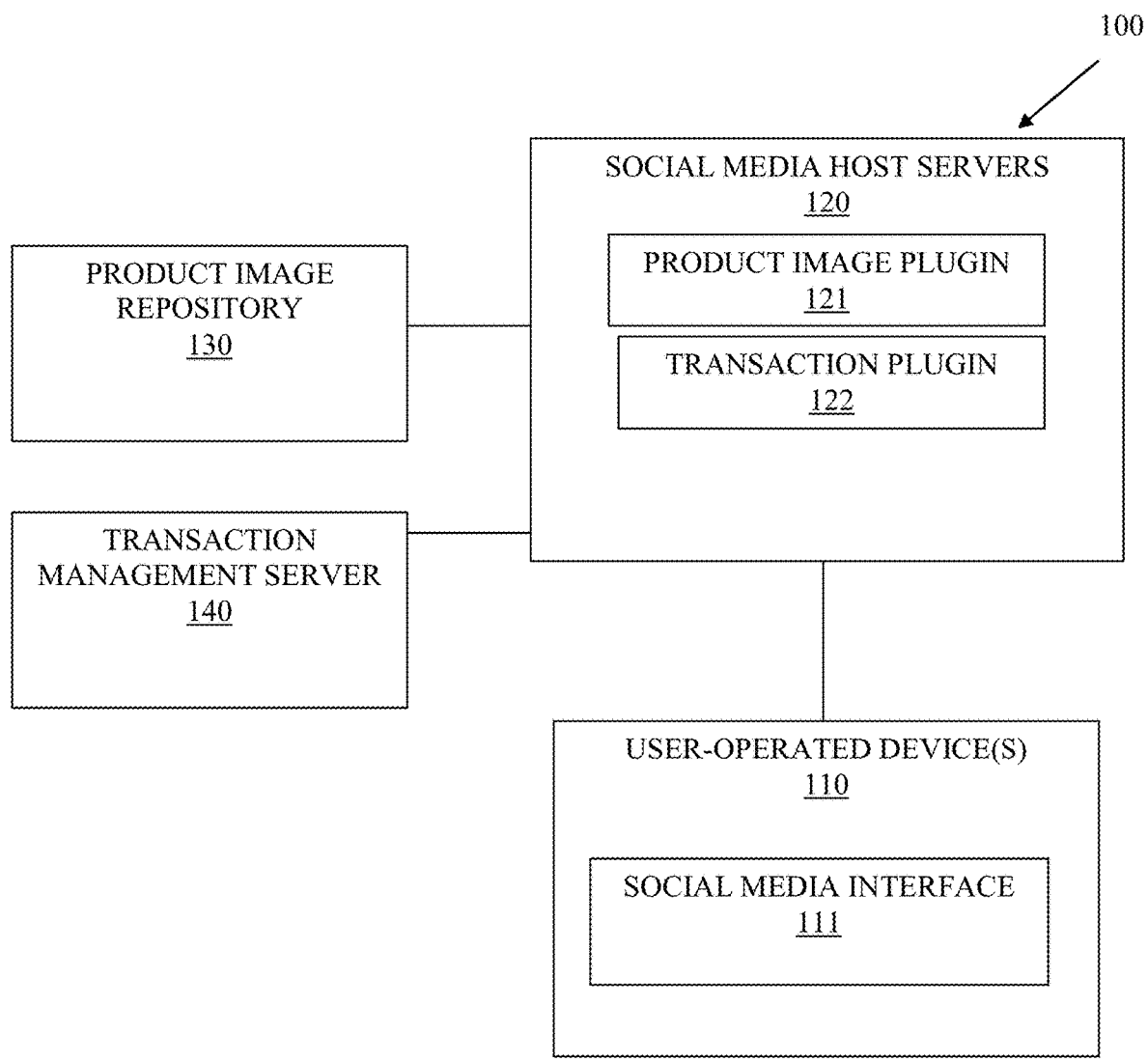
FIG. 1A is a diagram of a system for virtual store and social media integration processing, according to an example embodiment.

FIG. 1A is a diagram of a system 100 for virtual store and social media integration processing, according to an example embodiment. The various components are illustrated and the arrangement of the components is presented for purposes of illustration only. It is to be noted that other arrangements with more or less components are possible without departing from the virtual store and social media integration teachings presented herein and below.

The techniques, methods, and system presented herein and below for virtual store and social media integration processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

The term "product" refers to physical goods of a business (retailer, manufacturer, and/or distributor). As used herein, "apparel" is a type of product, which includes: clothing, hats, scarves, jewelry, accessories, or anything that capable of being worn by a user on some portion of the user's body/face (including cosmetics worn on a user's face and including tattoos worn on a user's body in a user-preferred location). Furniture is another type of product, which includes any physical structure purchased by a user for placement and/or use by the user (including trinkets and art work). An appliance is yet another type of product, which includes mechanical and electro-mechanical devices that are operated by the user for some purposes (including devices that larger operate on their own with a power supply).

The phrase "virtual store" is intended to mean an online and visual representation (image and/or video) of a product having a plurality of software processing that emulates a real-world user-interaction (wearing) with the product and having processing for sizing, ordering, and/or purchasing the product during or after the interaction.

"Social Media" includes any messaging platform/system that provides interaction between multiple users as a means of visual, audio, and/or video communication between the users. Social media platform/systems refers to the host servers for social media, client interfaces used for accessing the social media, and the software for deploying the social interaction between multiple users. Some example, social media includes, but is not limited to, Facebook®, Twitter®, Snapchat®, Instagram®, MSQRD®, SNOW®, BOO!®, Camera 360®, and others.

The system 100 includes a user-operated device 110 having a social media interface 111. The system 100 also includes one or more social media host servers 120 having a product image plugin 121 and a transaction plugin 122. Furthermore, the system includes a product image repository 130 and a transaction management server 140. The components of the system 100 will now be discussed with reference to the FIGS. 1A-1C.

The user-operated device 110 includes one of: a wearable processing device, a phone, a tablet, a laptop, a desktop, a computer-enabled device that is integrated into a vehicle, and any network-enabled device that is part of the Internet-of-Things (IoTs).

The social media interface 111 is a messaging interface that is rendered to, exposed on, or installed on the user-operated device 110 for a user to interact with the social media host servers 120.

The social media host servers 120 can be a single server or multiple servers that cooperate as a cloud processing environment.

The produce image plugin 121 is a novel Application Programming Interface (API) that is processed and callable as an option presented within the social media interface 111. The plugin 121 can be called when any image or any video is being presented to the user within the social media interface 111. The plugin interacts with an external product image repository 130.

The product image repository 130 includes images of products. These images can be acquired from a user by allowing the user through the plugin 121 to label the product and provided the image of the product to the plugin for registration and storage in the repository 130. Additionally, the product images housed in the repository 130 can be provided through one or more retail systems having an API for identifying, registering, and storing the product images in the repository 130. The repository 130 minimally includes indexed records for each unique product image, each record including a product description (label), and one or more retailer identifiers that identify the retailers providing the product. In an embodiment, each record may also include a social media identifier for each social media user that accessed and/or provided that image along with dates and times associated with creation or access. In an embodiment, the record also includes a link to or maintains a total number of times that the product image was liked, disliked, and/or shared within the social media platform/system associated with the social media host servers 120.

The user operates the interface 111 is any manner desired by the user and may provide a product image or search the repository for a particular product image from the product image repository 130 through the plugin 121. The plugin 121 then exposes a number of options to the user through the interface 111, such as permitting the user to select a portion of a user's body in a first user image and apply as filter the product image to merge the image of user's body (face, torso, legs, hands, arms, feet, lips, ears, cheeks, shoulders, neck, etc.). Another option, is to tack a video of the user and apply the filter for merging the product image into the video steam, such that the video stream tracks with movement of the user within the video displaying appropriately the product image on the user designated body part. A variety of filters that merge an image with another image exists and can be integrated into the plugin 121 as do video filters, which can be similarly integrated into or made callable from plugin 121.

Figure 1B:
FIG. 1B is an example screenshots for virtual store and social media integration processing, according to an example embodiment.
Figure 1C:
FIG. 1C is more example screenshots for virtual store and social media integration processing, according to an example embodiment.

Some examples, of different images of users and different product images merged in a single image are presented in the FIGS. 1B-1C. Facial recognition, facial meshing, or facial mapping filters may also be used for tracking facial movements while the product image is merged into the face as the face makes different expressions or moves. In an embodiment, a filter processes on a facial template of a user's face having points in the template defining features and locations for the face; the product image is then mapped to or tracked on the user's face within an image or video having the user's face. Specific filters may be used for different types of product images, such as masks, makeup, caps, sunglasses, jewelry, fake beards, etc. and as illustrated in the FIG. 1B. The FIG. 1C shows merged product images into images of a user for a variety of additional products.

In addition, the user through the interface 111 and the plugin 121 can identify the product image (through searching the repository 130, from a current taken image of the product, or from a photo library available on the device 110) before selecting or taking a selfie image of the user. That is, the order of selecting the two images being merged (user and product images) can user-determined.

Still further, the video tracking and merging or image merging can be done for non-human images depicting a setting (room), such as when the product image is a type of product that is a piece of furniture, art work, or an appliance. In an embodiment, the filter applied by the plugin 121 permits the user to be in a video of the setting with the product merged into that setting.

When a product image is added by a retailer or the user as a new product image for a new product. Filters can be assigned for merging and tracking with merging the new product, such as face filters, body filters, tracking and merging filters and the like. The types of filters available can be maintained as identifiers in the repository 130 with the product image record. In some cases, the plugin 121 can automatically assign the filters, in other cases, the retailer can provide the filter when updating the repository 130.

Once the merged product image is completed, the user is free to share, like, and post for distribution the merged product image within the social media platform/system. The plugin 121 maintains a unique code for the merged product image that permits the social media platform through an API of the social media platform to provided metrics with respect to the merged product image including total number of views, total number of likes, and/or total number of dislikes. A retailer can access the social media platform/system and subscribed for having the metrics pushed to the retailer as reports or the retailer can dynamically pull on demand the metrics.

The transaction plugin 122 provides a mechanism for a user interacting with the interface 111 to purchase the product or other users that view the merged product image or video tracking with the merged product image. This can be done by unobtrusively superimposing a purchase button on the image and/or video. When the button is activated, the transaction plugin provides a link to one of: an internal purchase mechanism available within the social media platform/system, a retailer transaction system for which the product is available, or a third-party transaction manager 140 for purchasing the product. APIs in the plugin 122 product the appropriate retailer and product identifiers to any internal purchase mechanism associated with the social media platform/system. APIs can also provide the appropriate product identifier to the specific retailer transaction manager and the third-party transaction manager 140. Any actual activation of the purchase button and any subsequent successful purchase is tracked and recorded in the product image record of the repository 130 and/or as available metrics retrievable from the social media platform/system API.

In this manner, the social media likes, views, dislikes, purchase attempts, and successful purchases for the product associated with the product image are maintained as metrics. The metrics can be retrieved on demand or reported automatically to the retailer associated with the product. This provides a mechanism for retailers track, learn (successes and failures), and reach consumers (users) through integration of the retailer's products in a virtual store that is integrated into social media platforms/systems in a manner that social media users are used to utilizing the social media. This also allows social media platforms/systems to negotiate fees for successful purchases from the retailers to increase revenues. Furthermore, this also allows users to virtually try on and share products for social media acceptance before actually purchasing the product.

In an embodiment, the product image mapping (for an image of the user) or tracking (for video images of the user) is achieved on a live video or image feed. That is, the user does not have to already have an existing image or video and do the mapping or tracking live as the image is being taken or while the video is being taken.

In an embodiment, the product image can be created dynamically by the user. For example, some retailers permit customers to custom build their products from a variety of existing features of the product. This creates a real-time and custom-built image, such image may be supplied to the system 100 or housed in the repository 130. A particular example, Adidas® provides a customer an interface for building a shoe in real time with different textures, colors, or prints.

In an embodiment, the plugin 121 or 122 provides a shared geolocation of the user (such as is provided in existing social media platforms). The plugins 121 or 122 detects the user accessing the plugin 121 for "trying on or out" a given product (identified from the product image) at a first retailer location or within a predefined geofenced boundaries. This can be pushed to a first retailer for that retailer to push through the plugin 122 a promotion or enticement if the user purchases the product at the first retailer. Alternatively, a second retailer can push a same or similar product being offered by the second retailer at a second retailer location within the geofenced boundaries along with an enticement to get the user to leave the first retailer store and buy the product at the second retailer store. This geolocation information can be leveraged from the existing social media platforms that provide geolocations for the user-operated devices 110. The plugins 121 and 122 can include APIs for reporting in real time the product identifier and the geolocations to retailers that subscribed for access to the system 100. This can also be used for partnering retailer when the user is not actively trying on a specific product. For example, suppose the plugin 121 or 122 obtains a geolocation for a user through the social media platform indicating that the user is at a restaurant and the restaurant is partnering with a retailer, the partnering retailer is made aware of this real-time location specific information and can push a notification through the plugins 121 or 122 offering for the user to try out a product through the product image for that product within the social media platform, and possibly the retailer can push a promotion for purchasing the product to the user through the plugin 122. In this last scenario, the retailer is within preconfigured geographical boundaries of the current location of the user (the restaurant location—user within a geofenced area) that triggers the initial notification to the retailer. This scenario can also work in the reverse, where the user is actively trying on a product of the retailer at the retailer's location through the system 100 and the restaurant is notified in real-time and pushes a promotion for food items (unrelated to the product) through the plugin 121 or 122. Other scenarios can exist as well that integrated the product image processing with related or unrelated retailer offerings.

In an embodiment, the system 100 is interfaced to a retailer's promotion engine and is preconfigured to delivery retailer-defined promotions for products or services based on a total number of shares (reposts) and/or likes achieved by the user with the initial posting on the social media platform and/or to different social media platforms (reached after the initial posting). The promotion can be directly related, somewhat related, or entirely unrelated to the product that was being shared through the social media platform.

In an embodiment, the plugin 122 includes a digital wallet feature that can be preloaded with funds, linked to a credit card, and/or include a cryptocurrency. The wallet is accessed for purchasing the product by the user. In an embodiment, the wallet can convert automatically between different types of currencies available from funds in the wallet to a currency accepted by a retailer for purchasing the product (for example convert a cryptocurrency to dollars or convert to Snapcash®).

In an embodiment, the plugin 122 includes loyalty points for purchasing products on the social media platform. The points can be converted by the plugin 122 into currency for purchasing products. In an embodiment, the points are specific to system 100.

In an embodiment, the plugin 122 permits a user to access the user's specific retailer-based loyalty points when transacting to purchase a product through that retailer for purposes of obtaining loyalty points with that retailer during the transaction and/or for purposes of converting existing loyalty points held by the user with that retailer into discounts when purchasing the product.

In an embodiment, the plugin 122 can utilize a profile known for the user that provides the user's sizing for various parts of the user's body, such that dynamic and real-time sizing is unnecessary when the user attempts to buy any product through the plugin 122.

In an embodiment, the plugins 121, 122, and the interface 111 is provided as a standalone service that provides the processing discussed above to users and retailers devoid of any social media platform/system. Retailers subscribe to the service and supply their product images and/or image merge and video tracking and merging filters (or assign them from a list of available filters provided by the service). Each retailer providing its own virtual store within the service.

In an embodiment, the service is accessible from an online transaction processing system such as eBay®, Amazon®, Apple® App Store, Google® App Store, etc.

In an embodiment, the plugins 121 and 122 are integrated into an online transaction processing system and the processing discussed above is provided through an online transaction processing interface available on device 110 to the user.

In an embodiment, the plugins 121 and 122 are integrated into a specific retailer's online store to provide the processing discussed above through that retailer's interface available to the user on device 110.

In an embodiment, the plugin 121 includes functionality for sizing the user for product purchase, this can be done with existing available online techniques that are callable from the plugin and that utilize an API for integrated the sizing with the plugins 121 and 122. In an embodiment, the sizing feature is integrated with just the transaction plugin 122 after the user has decided to purchase the product. Sizing includes sizing a specific user's size for a given product and its available sizes for, by way of example only, head (hat size), finger/wrist size, shirt size, pant size, etc.

These embodiments and other embodiments are now discussed with reference to the FIGS. 2-4.

Figure 2:
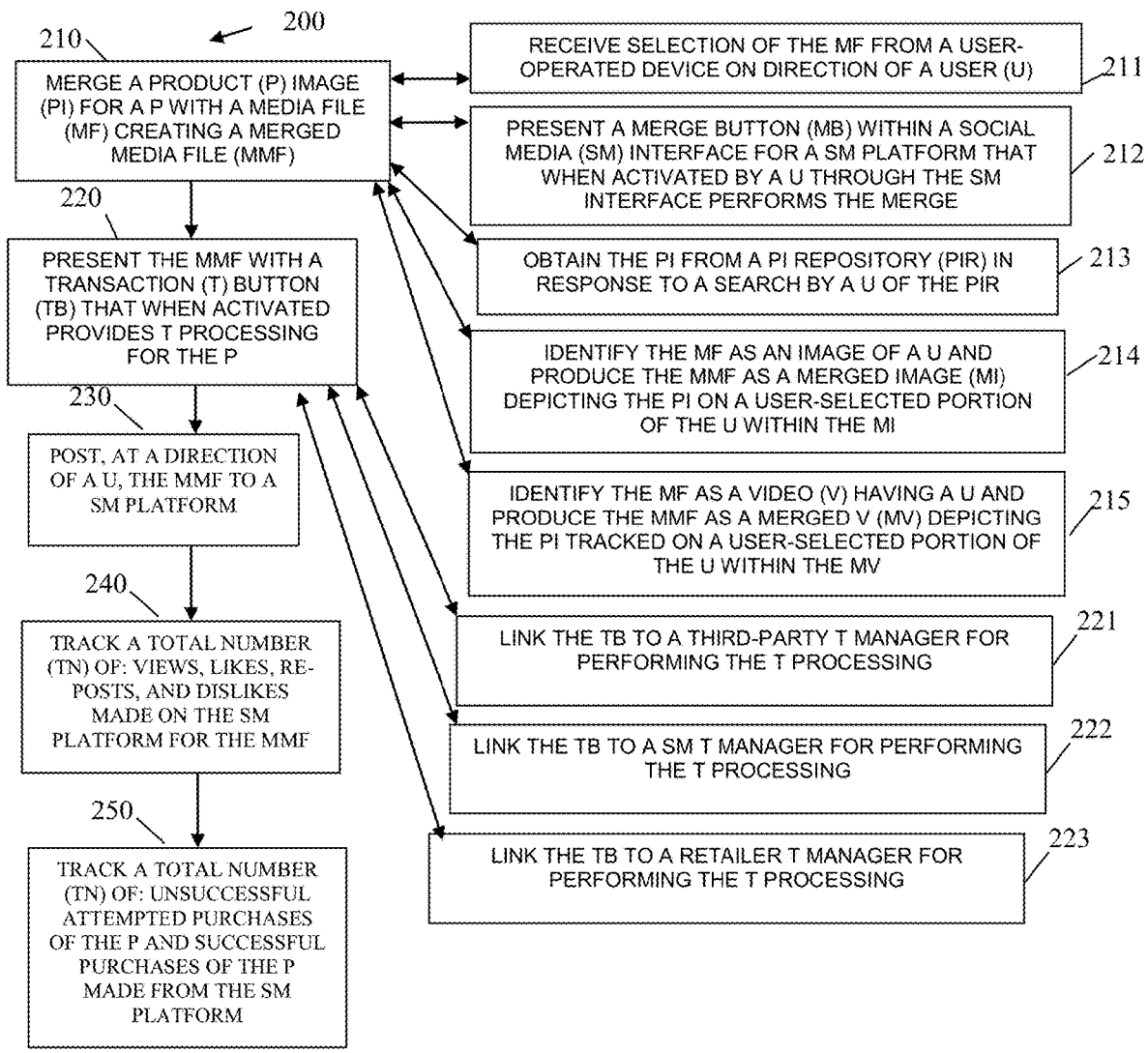
FIG. 2 is a diagram of a method for virtual store and social media integration processing, according to an example embodiment.

FIG. 2 is a diagram of a method 200 for virtual store and social media integration processing, according to an example embodiment. The software module(s) that implements the method 200 is referred to as a "virtual product interaction manager." The virtual product interaction manager is implemented as executable instructions programmed and residing within memory and/or a non-transitory computer-readable (processor-readable) storage medium and executed by one or more processors of a device. The processor(s) of the device that executes the virtual product interaction manager are specifically configured and programmed to process the virtual product interaction manager r. The virtual product interaction manager has access to one or more networks during its processing. The networks can be wired, wireless, or a combination of wired and wireless.

In an embodiment, the virtual product interaction manager is all of or some combination of the plugins 121-12, repository 130, and the transaction management server 140.

In an embodiment, the device that executes the virtual product interaction manager is the social media host server 110.

In an embodiment, the device that executes the virtual product interaction manager is an online transaction processing server.

In an embodiment, the device that executes the virtual product interaction manager is a specific retailer's transaction processing server.

In an embodiment, the device that executes the virtual product interaction manager is a plurality of servers logically organized as a cloud processing environment.

At 210, the virtual product interaction manager merges a product image for a product with a media file creating a merged media file. In an embodiment, the virtual product interaction manager applies one of a plurality of image or video filters to perform the merge processing. The media file can be an image or a video.

According to an embodiment, at 211, the virtual product interaction manager receives selection of the media file from a user operated device on direction of a user. In an embodiment, the user-operated device is 120.

In an embodiment, at 212, the virtual product interaction manager presents a merge button within a social media interface for a social media platform that when activated by a user through the social media interface activates the virtual product interaction manager for performing the merge. In an embodiment, the virtual product interaction manager performs this processing as a plugin to the social media platform as discussed above with the FIGS. 1A-1C.

In an embodiment, at 213, the virtual product interaction manager obtains the product image from a product image repository in response to a search made by a user of the product image repository. In an embodiment, the product image repository is the repository 130.

In an embodiment, the virtual product interaction manager receives the product image from a user and records a product identifier and the product image in the repository 130.

In an embodiment, at 214, the virtual product interaction manager identifies the media file as an image of a user, and the virtual product interaction manager produces the merged media file as a merged image that depicts the product image on a user-selected body portion of the user within the merged image.

In an embodiment, at 215, the virtual product interaction manager identifies the media file as a video depicting a user, and the virtual product interaction manager produces the merged media file as a merged video that depicts the product image tracked on a user-selected body portion of the user within the merged video.

At 220, the virtual product interaction manager presents the merged media file with a transaction interface button that when activated provides transaction processing for the product.

In an embodiment, at 221, the virtual product interaction manager links the transaction button to a third-party transaction manager for performing the transaction processing. In an embodiment, the third-party transaction manager is the transaction manager 140.

In an embodiment, at 222, the virtual product interaction manager links the transaction button to a social media transaction manager for performing the transaction processing.

In an embodiment, at 223, the virtual product interaction manager links the transaction button to a retailer transaction manager for performing the transaction processing.

According to an embodiment, at 230, the virtual product interaction manager posts, at a direction of a user, the merged media file to a social media platform. In an embodiment, the social media platform processes on the social media host servers 110.

In an embodiment of 230 and at 240, the virtual product interaction manager tracks a total number of: views, likes, re-posts, and dislikes that are recorded on the social media platform for the merged media file having the product image for the product.

In an embodiment of 240 and at 250, the virtual product interaction manager tracks a total number of: unsuccessful attempted purchases of the product through activation of the transaction button by the user and successful purchases of the product that are completed by the user and other users from the social media platform.

Figure 3:
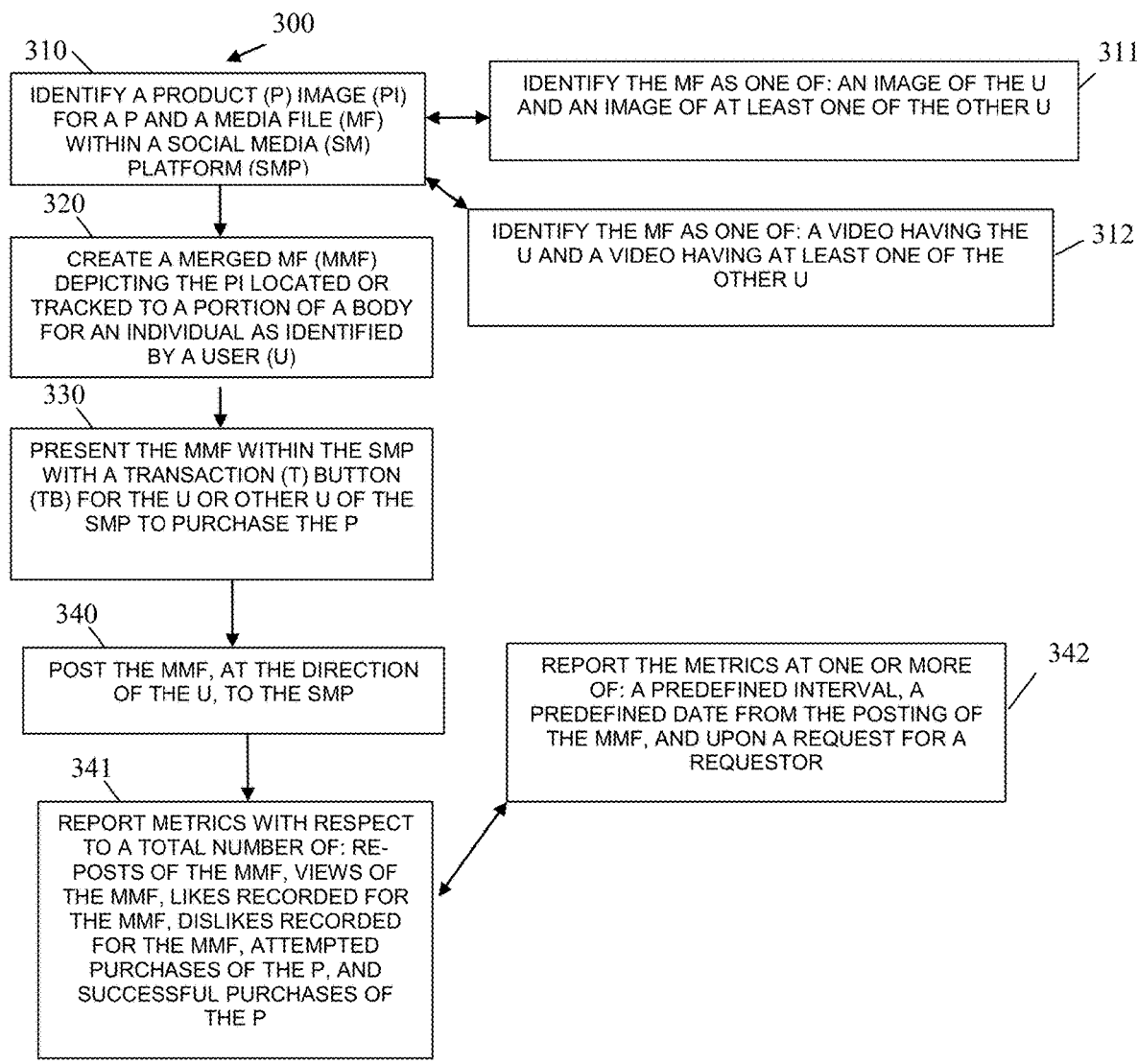
FIG. 3 is a diagram of another method for virtual store and social media integration processing, according to an example embodiment.

FIG. 3 is a diagram of another method 300 f virtual store and social media integration processing, according to an example embodiment. The software module(s) that implement the method 300 is referred to herein as a "virtual store and social media integration manager." The g virtual store and social media integration manager is implemented as executable instructions and programmed within memory and/or a non-transitory computer-readable (processor-readable) storage medium that executes on one or more processors of a device. The processors of the device are specifically configured to execute virtual store and social media integration manager. The virtual store and social media integration manager has access one or more networks; the networks can be wired, wireless, or a combination of wired and wireless.

The processing described herein for the virtual store and social media integration manager provides another and in some cases enhanced processing perspective of the method 200.

In an embodiment, the virtual store and social media integration manager is all of some combination of the processing discussed above with respect to the system 100 and the method 200.

In an embodiment, the device that executes the virtual store and social media integration manager is the social media host servers 120.

In an embodiment, the device that executes the virtual store and social media integration manager is a plurality of servers operating as a cloud processing environment.

At 310, the virtual store and social media integration manager identifies a product image for a product and a media file within a social media platform. The media file can be a second image or a video. In an embodiment, the social media platform processes on the social media host servers 110.

According to an embodiment, at 311, the virtual store and social media integration manager identifies the media file as one of: an image of the user and an image of at least one other user.

In an embodiment, at 312, the virtual store and social media integration manager identifies the media file as one of: a video depicting the user and a video depicting at least one other user.

At 320, the virtual store and social media integration manager creates a merged media file depicting the product image located or tracked on a portion of a body for an individual as identified by a user. It is noted that the product image can be virtual placed on and worn by someone other than the user at the direction of the user.

At 330, the virtual store and social media integration manager presents the merged media file within the social media platform with a transaction button for the user or other users of the social media platform to purchase the product while viewing the merged media file within the social media platform.

At 340, the virtual store and social media integration manager posts, at the direction of the user, the merged media file to the social media platform.

In an embodiment, at 341, the virtual store and social media integration manager reports metrics with respect to a total number of: re-posts of the merged media file made on the social media platform, unique views of the merged media file made on the social media platform, likes recorded for the merged media file on the social media platform, dislikes recorded for the merged media file on the social media platform, attempted purchases of the product initiated from the social media platform, and successful and completed purchases of the product following activation of the transaction button on the social media platform.

In an embodiment of 341 and at 342, the virtual store and social media integration manager reports the metrics at one or more of: a predefined interval of time, a predefined date from the initial posting of the merged media file, and upon a request from a requestor (on demand).

Figure 4:
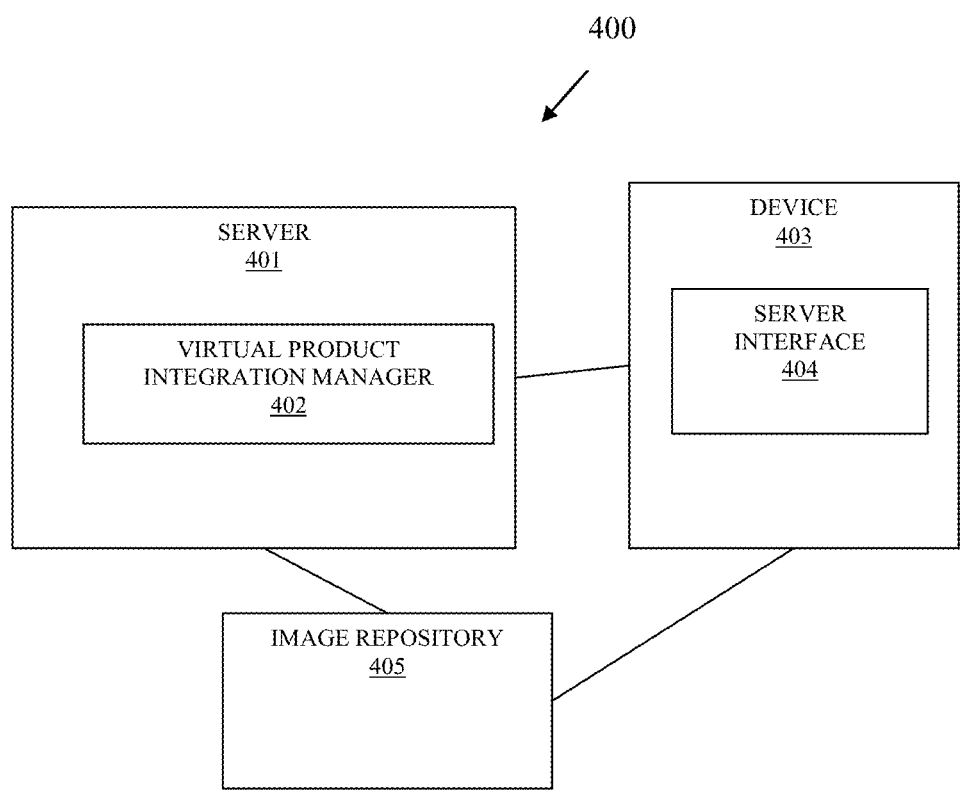
FIG. 4 is a diagram of another system for virtual store and social media integration processing, according to an example embodiment.

FIG. 4 is a diagram of a system 400 for virtual store and social media integration processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programed to perform the processing discussed above with the FIGS. 1A-1C and 2-3.

The system 400 includes a server 401 having a virtual product integration manager 402, and the system 400 includes a device 403 having a server interface 404. The system 400 also interacts with and maintains one or more image repositories 405.

In an embodiment, the server 401 is the social media hosts servers 120.

In an embodiment, the server 401 is a part of a cloud processing environment.

In an embodiment, the server 401 is an online transaction processing server.

In an embodiment, the server 401 is a specific retailer's online transaction processing server.

The virtual product integration manager 402 is configured to: i) execute on at least one processor of the device 403, ii) integrate a product image for a product with a media file to create a merged media file that depicts the product being worn by an individual within the merged media file and iii) provide with the merged media file a transaction mechanism for purchasing the product and a reporting mechanism for tracking metrics of the merged media file on a network.

In an embodiment, the virtual product integration manager 402 is all or some combination of the system 100, the method 200, and the method 300.

The server interface 404 is configured to: i) execute on at least one processor of the user-operated device 403, ii) interact with a user on the user-operated device 403 for identifying the product and the media file, iii) interact with the virtual product integration manager 402 to identify the user-identified product and media file, and iv) provide an activation mechanism for the user to activate the transaction mechanism with the virtual product integration manager 402.

In an embodiment, the server interface 404 is social media interface 121.

In an embodiment, the device 403 is one or more of: a phone, a wearable processing device, a laptop computer, a desktop computer, a computer-enabled device integrated into a transportation vehicle, a television, a digital sign, and a computer-enabled device that is part of the IoTs.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
merging, by executable instructions that are executed by a processor of a device, a product image for a product with a media file creating a merged media file, wherein merging further includes presenting a merge button within a social media interface for a social media platform that when activated by a user through the social media interface performs the merging, wherein merging further includes one of:
(i) identifying the media file as an image of a user and producing the merged media file as a merged image depicting the product image on a user-selected portion of the user within the merged image; and
(ii) identifying the media file as a video having a user and producing the merged media file as a merged video depicting the product image tracked on a user-selected portion of the user within the merged video;
presenting, by the executable instructions, the merged media file with a transaction button that when activated provides transaction processing for purchasing the product, wherein presenting further includes linking the transaction button to one or more of: a third-party transaction manager for performing the transaction processing, a social-media transaction manager for performing the transaction processing, and a retailer transaction manager for performing the transaction processing; and
posting, by the executable instructions and at a direction of the user, the merged media file to the social media platform.

2. The method of claim 1, wherein merging further includes receiving selection of the media file from a user-operated device on direction of a user.

3. The method of claim 1, wherein merging further includes obtaining the product image from a product image repository in response to a search by a user of the product image repository.

4. The method of claim 1, further comprising, tracking, by the executable instructions, a total number of: views, likes, reposts, and dislikes made in the social media platform for the merged media file.

5. The method of claim 4 further comprising, tracking, by the executable instructions, a total number of: unsuccessful attempted purchases of the product and successful purchases of the product made from the social media platform.

6. A method, comprising:
identifying, by executable instructions that execute on a processor of a device, a product image for a product and a media file within a social media platform;
creating, by the executable instructions, a merged media file depicting the product image located or tracked to a portion of a body for an individual as identified by a user interacting with a social media interface of the social media platform;
presenting, by the executable instructions, the merged media file within the social media platform with a transaction button for the user or other users of the social media platform to purchase the product; and
posting, by the executable instructions and at the direction of the user, the merged media file to the social media platform.

7. The method of claim 6 further comprising, reporting, by the executable instructions, metrics with respect to a total number of: re-posts of the merged media file, views of the merged media file, likes recorded for the merged media file, dislikes recorded for the merged media file, attempted purchases of the product, and successful purchases of the product.

8. The method of claim 7, wherein reporting further includes reporting, by the executable instructions, the metrics at one or more of: a predefined interval, a predefined date from the posting of the merged media file, and upon a request from a requestor.

9. The method of claim 6, wherein identifying further includes identifying the media file as one of: an image of the user and an image of at least one of the other users.

10. The method of claim 6, wherein identifying further includes identifying the media file as one of: a video having the user and a video having at least one of the other users.

11. A system, comprising:
a sever comprising a processor and a non-transitory computer-readable storage medium;
the non-transitory computer-readable storage medium comprising executable instructions representing a virtual product integration manager; and
a device comprising a device processor and a device non-transitory computer-readable storage medium;
the device non-transitory computer-readable storage medium comprising executable instructions representing a server interface;
wherein the virtual product integration manager when executed by the processor from the device non-transitory computer-readable storage medium causes the processor to:
integrate a product image for a product with a media file to create a merged media file that depicts the product being worn by an individual within the merged media file, wherein the merged media file includes an image of the individual or a video of the individual; and
provide with the merged media file a transaction mechanism for purchasing the product and a reporting mechanism for tracking metrics of the merged media file on a network, wherein the transaction mechanism includes a link to one of: one or more of: a third-party transaction manager to perform a transaction with respect to the product, a social-media transaction manager to perform the transaction with respect to the product, and a retailer transaction manager to perform the transaction with respect to the product
wherein the server interface when executed by the device processor from the device non-transitory computer-readable storage medium causes the device processor to:
interact with a user on a user-operated device to select the product and the media file;
interact with the virtual product integration manager to obtain the product image and the media file; and
provide an activation mechanism for the user to activate the transaction mechanism with the virtual product integration manager, wherein the activation mechanism is an interface button that when activated by the user traverses the link to: the third-party transaction manager, the social-media transaction manager, or the retailer transaction manager.

12. The system of claim 11, wherein the server is a social media host server for a social media platform, the virtual product integration manager is a plugin to the social media platform, and the server interface is a social media interface that processes on the user-operated device.

\* \* \* \* \*